US006993077B2

(12) United States Patent
Lee

(10) Patent No.: US 6,993,077 B2
(45) Date of Patent: Jan. 31, 2006

(54) EXPERIMENTAL DESIGN FOR MOTION ESTIMATION

(75) Inventor: Heng-Kuan Lee, Taipei Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 329 days.

(21) Appl. No.: 10/065,908

(22) Filed: Nov. 28, 2002

(65) Prior Publication Data

US 2004/0105495 A1    Jun. 3, 2004

(51) Int. Cl.
H04N 11/04    (2006.01)
(52) U.S. Cl. ............................. 375/240.16; 375/240.17
(58) Field of Classification Search ........... 375/240.16, 375/240.17
See application file for complete search history.

(56) References Cited

U.S. PATENT DOCUMENTS

| | | | |
|---|---|---|---|
| 6,229,850 B1 * | 5/2001 | Linzer et al. .......... | 375/240.11 |
| 6,259,737 B1 * | 7/2001 | Fung et al. ............ | 375/240.16 |
| 6,285,711 B1 * | 9/2001 | Ratakonda et al. .... | 375/240.16 |
| 6,449,312 B1 * | 9/2002 | Zhang et al. .......... | 375/240.16 |
| 6,628,711 B1 * | 9/2003 | Mathew et al. ........ | 375/240.12 |
| 2002/0041699 A1 * | 4/2002 | Kim ........................... | 382/107 |
| 2003/0072373 A1 * | 4/2003 | Sun ....................... | 375/240.16 |
| 2003/0198295 A1 * | 10/2003 | Chen et al. ............ | 375/240.16 |
| 2003/0231711 A1 * | 12/2003 | Zhang et al. .......... | 375/240.16 |

OTHER PUBLICATIONS

Kim, J.N. et al., A Fast Motion Estimation for Software Based Real-Time Video Coding, May 1999, IEEE Transactions on Consumer Electronics, vol. 45 No 2, pp. 417-425.*

Chalidabhongse, J. et al., Fast Motion Estimation Using Multiresolution-Spatio-Temporal Correlations, Jun. 1997, IEEE Transcations of Circuits and Systems for Video Technology, vol. 7 No. 3, pp. 477-488.*

* cited by examiner

Primary Examiner—Mehrdata Dastouri
Assistant Examiner—Patrick Cathey, II
(74) Attorney, Agent, or Firm—Winston Hsu

(57) ABSTRACT

An experimental design for motion estimation in video compression that reduces the number of search locations within a search window by selecting the search locations from a predefined orthogonal table. The search locations are then compared with a reference block to generate match-values that are used to generate level-values reflecting dispositional relationships of the search locations and the relative magnitudes of the match-values. A preliminary motion vector is generated according to the relative magnitudes of the level-values. Candidate results are also generated based on the match-values. A final motion vector is generated by applying predetermined formulas to the level-values and altering the preliminary motion vector according to the candidate results when indicated to do so by the results of the formulas.

16 Claims, 5 Drawing Sheets

EXPERIMENTAL DESIGN FOR MOTION ESTIMATION

BACKGROUND OF INVENTION

1. Field of the Invention

The present invention relates to motion estimation for video compression. More specifically, an experimental design for motion estimation for video compression is disclosed.

2. Description of the Prior Art

Video has become an integrated part of everyday electronic devices. While bandwidth and processing power continue to increase rapidly, the increases have only served to raise the demand for higher quality video products, which, in turn, require an even larger bandwidth and even more processing power.

Video compression standards have long been available to lower the required bandwidth and alternatively to increase the amount of video data that can be stored in any given sized storage media. In line with these goals, motion estimation is widely used for video compression standards such as MPEG-1, MPEG-2, and MPEG-4 among others.

The conventional methods for motion estimation are well known to those skilled in the art. Please refer to FIG. 1. In general, each frame goes through a process where a current video frame is read into memory. A small reference block is located within a larger search window of the current frame and a motion vector is generated estimating the direction of motion of the reference block within the search window. This motion vector is used in conjunction with information from the previous frame to generate an estimated image frame in respect to the current frame. The estimated image frame is then subtracted from the current frame, which effectively removes duplicated imagery and results in much less data necessary to be saved in the output file.

Because the estimated image frame is subtracted from the current frame and only the difference is saved, it is obvious that the more accurate the estimation is, the smaller the output file is. The accuracy of the estimated image frame to a large degree depends on the accuracy of the motion vector. The accuracy of the motion vector in turn depends on the accuracy of locating the reference block within the search window.

It is generally accepted that the reference block can be located within the search window most accurately using a full search as shown in FIG. 1. A full search consists of comparing the reference block sequentially with every possible location within the search window. For each location, the comparison is done by adding the absolute values of the difference between the brightness of each pixel in the reference block and the brightness of the corresponding pixel in the current search location. The location with the lowest total of absolute values is considered the best match and is selected to be used to calculate the motion vector.

While the most accurate, the problem with the full search method is the amount of calculations that need to be performed. For example in FIG. 1, the reference block is shown as 8 by 8 pixels and the search window is shown as 16 by 16 pixels. In this case, a full search requires comparing 81 possible locations with the reference block, each requiring calculating and summing 64 absolute values before the best match can be found. Obviously using more than one reference block or larger search windows drives the number of required calculations upward prohibitively. Because decoding the compressed video usually must be done on a real time basis and involves the similar processing steps in reverse, a tradeoff is made to balance the accuracy of the motion vector against the amount of arithmetic processing necessary, and therefore speed, when encoding or decoding motion estimation compressed video.

To reduce the number of calculations required, some algorithms compare the reference block with only selected, representative locations within the search window instead of every possible location. While this results in some loss of quality and in a larger file, the gain in speed is dramatic and the quality is still acceptable. The quality of the video is defined as being acceptable if the original and the processed images are indistinguishable to an average viewer at a distance of 6 times the height of the image. Examples of this method include a Three-step search, a Four-step search, and a hierarchical search.

A common approach to the compression problem involves generating three copies, or layers, of each frame. The first layer is identical with the original image. The second layer is the original image at one-half resolution. The third layer is the original image at one-fourth resolution. The third layer is searched first to find the best match of the reference block as described above and the center point of this best match is used as the central starting position of a second search in the higher resolutioned second layer. Similarly, the results of the second search yield a starting central starting position for a third search in the first layer. The position of the best match to the reference block in the first layer is used to calculate the motion vector.

To reduce the number of calculations necessary, the exact search process performed on any layer varies from method to method, however a full search is not necessary. Usually, a reduced number of search blocks within the search window are selected and sampled according to the particular method used. FIG. 2 illustrates an example of one such prior art method. In FIG. 2, an 8 by 8 pixel reference block is compared with 9 equally spaced 8 by 8 pixel search blocks within the 16 by 16 pixel search window. In this method, the number of search locations has been reduced from the 81 locations required by the full search in FIG. 1 to only the 9 locations (on each layer) shown in FIG. 2, a dramatic improvement, and still results in acceptable quality video. However, the number of calculations required for each video frame is still quite high and any further reduction in the number of search locations reduces processor load allowing higher resolution or larger images to be real-time encoded and decoded.

SUMMARY OF INVENTION

It is therefore a primary objective of the claimed invention to disclose a device and method of motion estimation using a reduced number of search locations. This reduction in search locations reduces the number of arithmetic calculations needed for motion estimation, reducing processor load allowing higher resolution or larger images to be encoded and decoded in real-time.

Briefly summarized, the claimed invention discloses selecting the search locations within the search window according to an orthogonal table. A reference block is then compared with each search location and a match-value is generated for each search location representing how closely that search location matches the reference block. One example of the present invention generates match-values by summing the absolute difference of brightness values for each pixel in the reference block compared to the corresponding pixel in the search location. Another example uses the mean absolute difference in brightness values to generate the match-values.

Next, for each column in the orthogonal table, first and second level-values are respectively generated according to the match-values of the search locations having a first or second value in the orthogonal table. Third level-values that are the absolute difference of the first and second level-values for each column in the orthogonal table are then calculated. Next, a preliminary motion vector based on the relative magnitudes of the first level-values and the second level-values is then generated. Then a candidate result based on the match-values is calculated for each interactive effect column in the orthogonal table. Finally, the preliminary motion vector is altered to values designated by the candidate results when predetermined formulas indicate that the preliminary motion vector requires adjustment to generate a final motion.

The present invention also encompasses a device uses motion estimation in video compression. The device includes a memory and a control circuit for executing computer code stored in the memory. The computer code determines a plurality of search locations within a search window, comparing a reference block with each search location and generating a match-value for each search location, generating a plurality level-values, generating a preliminary motion vector based on the level-values, generating candidate results, and generating a final motion vector by altering the preliminary motion vector according to the candidate results as indicated by a predetermined set of formulas. Additionally, the above described computer code may be stored on a computer readable media and loaded into memory as required.

It is an advantage of the claimed invention that reducing the number of search locations reduces the number of arithmetic calculations needed for motion estimation, reducing processor load allowing higher resolution or larger images to be encoded and decoded in real-time without sacrificing the quality of the video image.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
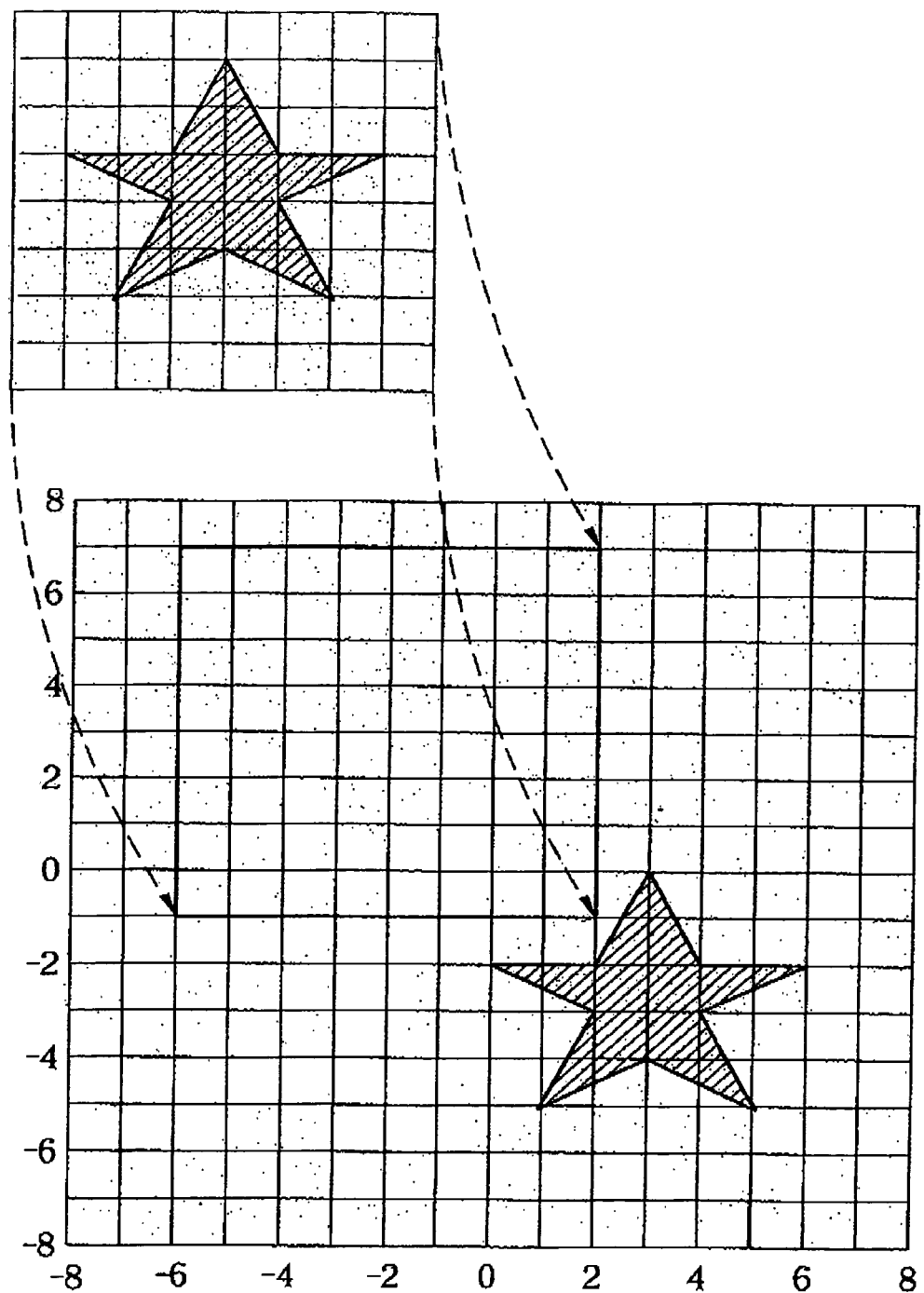
FIG. 1 is an illustration of using a small reference block to search a larger search window for motion estimation in video compression.
Figure 2:
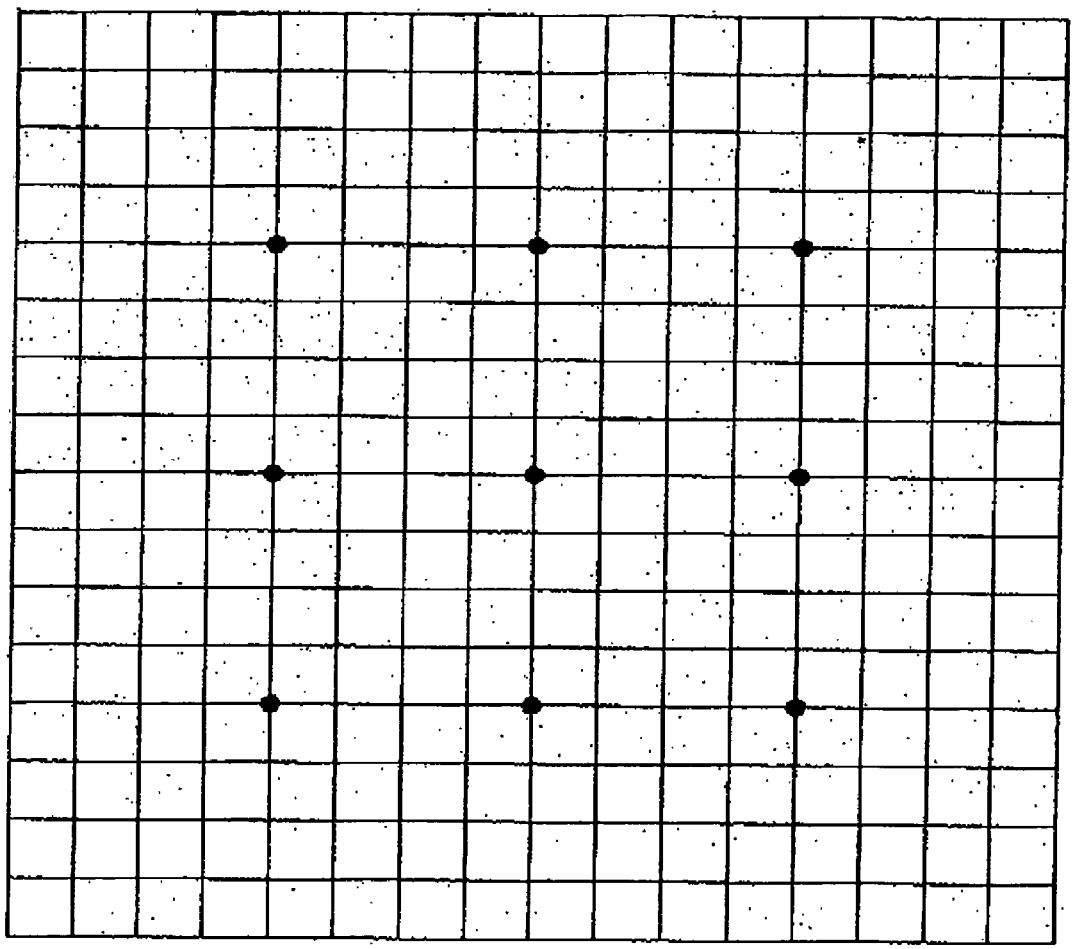
FIG. 2 illustrates the central starting positions of selected search blocks within a search window according to the prior art.
Figure 3:
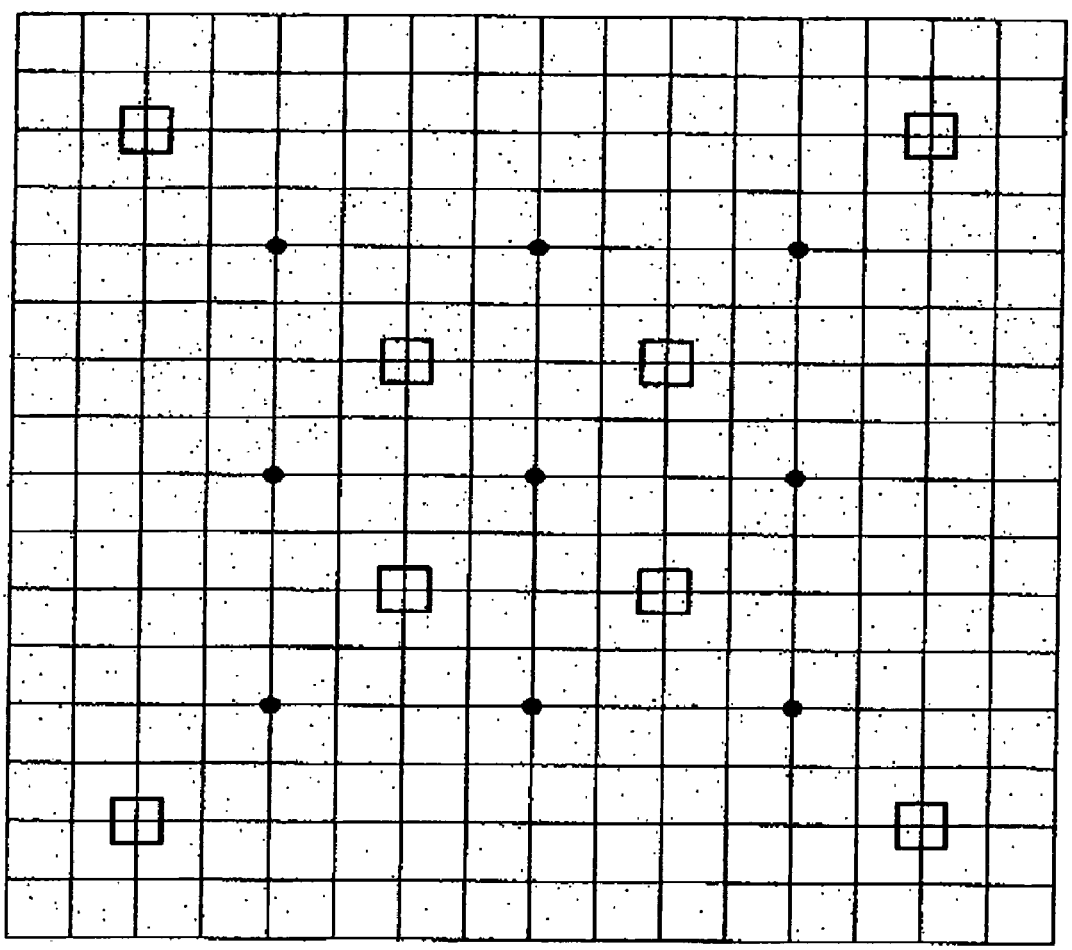
FIG. 3 illustrates a comparison of the selected search blocks in FIG. 2 with selected search blocks according to the present invention.

Throughout the following description of motion estimation in video compression according to the present invention, the term "motion vector" is defined to be a coordinate within a search window that defines the position of a search location within that search window. In the following examples, the coordinate corresponds to the upper left corner of the search location but is not to be restricted as such. Correspondences elsewhere within the search window are equally possible with the addition of an appropriate offset.

Additionally, for the sake of simplicity in the examples, the search window is defined to be a square block 16 by 16 pixels and a reference block is defined to be a square block 8 by 8 pixels although changes in the size or shape of either the search window or the reference block would still fall within the scope of the present invention.

A 4-bit number (for example "1010") representing the X coordinate and another 4-bit number representing the Y coordinate of the search window would best represent the motion vector for such an arrangement. The most significant bit of the X coordinate will be variable and referred to as "A". The second most significant bit of the X coordinate will be variable and referred to as "B". The most significant bit of the Y coordinate will be variable and referred to as "C". The second most significant bit of the Y coordinate will be variable and referred to as "D". The remaining bits of the X and the Y coordinates will be referred to as $xx_1$ and $yy_1$ (for the X and Y coordinate) and are fixed design parameters that may be adjusted to fine-tune a given system. Thus, using a combination of the X and Y coordinates $ABxx_1$ and $CDyy_1$ allows unique identification of any of the 81 possible 8 by 8 pixel search location within the search window by uniquely identifying the upper left corner of the search location. The specific values used in this example are $xx_1=10$ and $yy_1=10$ to produce a better distribution of the search locations but do not limit the scope of the invention.

The key to reducing the number of search locations in a search window is in identifying a small subset of the possible search locations that are representative of different areas of the search window. For aiding a variety of analytical purposes, statisticians have long established a great diversity of tables. One such table type is called an orthogonal table and the established orthogonal table for the 4 variables A, B, C, and D is shown below in Table 1.

TABLE 1

|          | A | B | AB | C | AC | BC | D |
|----------|---|---|----|---|----|----|---|
| Sample 1 | 0 | 0 | 0  | 0 | 0  | 0  | 0 |
| Sample 2 | 0 | 0 | 0  | 1 | 1  | 1  | 1 |
| Sample 3 | 0 | 1 | 1  | 0 | 0  | 1  | 1 |
| Sample 4 | 0 | 1 | 1  | 1 | 1  | 0  | 0 |
| Sample 5 | 1 | 0 | 1  | 0 | 1  | 0  | 1 |
| Sample 6 | 1 | 0 | 1  | 1 | 0  | 1  | 0 |
| Sample 7 | 1 | 1 | 0  | 0 | 1  | 1  | 0 |
| Sample 8 | 1 | 1 | 0  | 1 | 0  | 0  | 1 |

The table is generated using the statistical model for four variables $x=\mu+A+B+C+D+A\times B+A\times C+B\times C+\epsilon$ where $\epsilon$ is an error factor, and $\mu$ is an average of A, B, C, D, AB, AC, and BC. It is important to note that the italicized A, B, C, and D in the statistical model are not the same as the four variables A, B, C, and D previously defined. A (italicized) is not equal to A (un-italicized). A (italicized) is the effect of A (un-italicized), meaning that if A (un-italicized) is changed, x will change by this amount. Additionally, the notations A×B, A×C, and B×C do not mean multiplication, rather indicate the interactive effects of A and B, A and C, and B and C From the table 1, search locations can be determined. The binary bit in column A can be used as the most significant bit of an X coordinate in the search window, in column B, the second most significant bit of the X coordinate in the search window. The binary bit in column C can be used as the most significant bit of a Y coordinate in the search window, and column D can be used as the second most significant bit of the Y coordinate in the search window.

Each row in Table 1 represents a search location. For example, the search location labeled "Sample 1" is an 8 by 8 pixel block extending downward and to the right of the coordinate $(00xx_1, 00yy_1)$ in the search window. Although the number of possible combinations of the variables A, B, C, and D is 16, use of the orthogonal table reduces the number of search locations (Sample 1 to Sample 8) to only 8, a reduction from the number of search locations used in the prior art.

Now that the search locations have been identified, an 8 by 8 pixel reference block is compared with each of the 8 search locations in the search window of the current video frame. As in the prior art, the comparison is normally done by summing the absolute values of the difference in brightness between each pixel in the reference block and the corresponding pixel in the search location. The search location that has the lowest sum of the absolute differences (SAD) is considered the best match. However, another method of comparison used in another embodiment of the present invention, such as selecting the search location with the lowest mean absolute differences, also falls within the spirit of the invention. What is obviously important is to find the search location having the best match-value with the reference block. In this explanation, the SAD is used to select the best match-value.

Table 2 shows a simplified version of Table 1 showing only the columns A, B, C, and D (representing the respective coordinate values for each of the search locations) and an additional column (SAD) showing the SAD of search locations using an example reference block and search window. The specific SADs shown here are only an example to facilitate disclosure of the present invention and may vary as the specific reference block and/or search window changes.

TABLE 2

|  | A | B | C | D | SAD |
|---|---|---|---|---|---|
| Sample 1 | 0 | 0 | 0 | 0 | 123 |
| Sample 2 | 0 | 0 | 1 | 1 | 234 |
| Sample 3 | 0 | 1 | 0 | 1 | 23 |
| Sample 4 | 0 | 1 | 1 | 0 | 545 |
| Sample 5 | 1 | 0 | 0 | 1 | 123 |
| Sample 6 | 1 | 0 | 1 | 0 | 633 |
| Sample 7 | 1 | 1 | 0 | 0 | 579 |
| Sample 8 | 1 | 1 | 1 | 1 | 444 |

Even though the 8 search locations identified by the orthogonal table are considered to be representative of areas of the search window, the present invention again differs from the prior art in the generation of the motion vector. Prior art methods, given the data in the Table 2, would merely assume that Sample 3 is the best match and use the coordinates of Sample 3 to begin a new search on the next highest resolutioned level. However, it is an important and necessary step in the present invention to analyze the relationships of the SADs of all the search locations within the search window in order to generate a preliminary motion vector, and then to correct the motion vector for errors incurred due to regional minimums or other similar causes. This is done by checking for interactive effects based on the dispositional relationships of the search locations and the relative magnitudes of the SADs.

To perform this analysis, a set of level-values are calculated and are shown in Table 3. Table 3 shows, for each column of Table 1, the sums of the SADs having similar distinct values and a column containing the absolute (ABS) difference of those values. To continue with the previous example, Table 1 shows Sample 1, Sample 2, Sample 3, and Sample 4 all having a "0" in the column "A". Therefore, to construct the Table 3, the SADs for Sample 1 (123), Sample 2 (234), Sample 3 (23), and Sample 4 (545) are added together and the sum (123+234+23+545=925) is placed in the "Level 0" column of the Table 3 in the row marked "A". The sum of the SADs of the samples having a "1" in Column "A" of Table 1 (Sample 5, Sample 6, Sample 7, and Sample 8) are placed in the "Level 1" column of the Table 3 in the row marked "A". The column of the Table 3 marked "ABS Diff" represents the absolute difference between the "Level 0" values and the "Level 1" values for that row. For the row marked "A", the "ABS Diff" is therefore ABS(Level 0 Level 1)=ABS(925 1779)=854. Level-values for the remaining 6 columns of the Table 1 are calculated in the same manner and are shown in the Table 3.

TABLE 3

|  | Level 0 | Level 1 | ABS Diff |
|---|---|---|---|
| A | 925 | 1779 | 854 |
| B | 1113 | 1591 | 478 |
| C | 848 | 1856 | 1008 |
| D | 1880 | 824 | 1056 |
| AB | 1380 | 1324 | 56 |
| AC | 1223 | 1481 | 258 |
| BC | 1235 | 824 | 1056 |

Once the level-values of the Table 3 have been determined, the minimum level-value (Level 0 or Level 1) for each of the rows A, B, C, and D in Table 3 is used to generate the respective bits of a preliminary motion vector $(ABxx_1, CDyy_1)$ If, as in the example for row "A", the value of Level 0 is less than the value of Level 1, then the bit "A" in the preliminary motion vector is set to be "0", otherwise the bit "A" of the preliminary motion vector is set to be "1". The bits B, C, and D of the preliminary motion are determined similarly. In this example, A=0, B=0, C=0, and D=1 so the preliminary motion vector becomes $(00xx_1, 01yy_1)$.

Note that the values of the preliminary motion vector of this example differ (but do not necessarily need to differ) from the values that would have been selected by the prior art as discussed above (that of the Sample 3 $(01xx_1, 01yy_1)$). This is due to interactive effects based on the dispositional relationships of the search locations and the relative magnitudes of the SADs.

The results are next checked for variance using a set of formulas. The orthogonal table (Table 1) of the present invention is used to generate a candidate result list that can be used to modify the preliminary motion vector if the formulas indicate that the preliminary motion vector needs to be modified. In this example, the candidate result list will be generated before applying the formulas to simplify the procedural explanation. Obviously, the candidate result list can equally well be generated only in response to one or more of the formulas. Either method falls within the scope of the present invention.

To generate the candidate result list, the appropriate columns A, B, and C of the Table 1 are each used to produce one set of 4 candidate results (3 separate lists of 4 results).

Combinations representing AB, AC, and BC are represented in the orthogonal table and therefore need to be calculated as candidate results. Possible combinations such as AD, BD, and CD are not present in the columns of the orthogonal table and therefore do not need to be calculated.

Continuing with the example, there are 4 combinations of the distinct values "1" and "0" in the columns A and B of the Table 1:

1) A="0", B="0" and represented as A0B0,
2) A="0", B="1" represented as A0B1,
3) A="1", B="0" (A1B0), and
4) A="1", B="1" (A1B1).

The value assigned to A0B0 is equal to the sum of the SADs of the search locations in the Table 1 having A equal to "0" and B equal to "0", or Sample 1 (123)+Sample 2 (234)=357. The value assigned to A0B1 is equal to the sum of the SADs of the search locations having A equal to "0" and B equal to "1", or Sample 3 (23)+Sample 4 (545)=568. The value assigned to A1B0 is equal to Sample 5 (123)+Sample 6 (633)=756. The value assigned to A1B1 is equal to Sample 7 (579)+Sample 8 (444)=1023. The values for the remaining candidate result lists are calculated similarly and each set is sorted in ascending order to produce a finished candidate result list of:

A0B0=357, A0B1=568, A1B0=756, A1B1=1023
A0C0=146, A1C0=702, A0C1=779, A1C1=1077
B0C0=246, B1C0=602, B0C1=867, B1C1=989

Only one representative of each of the 3 candidate result lists whose value is the lowest within that list is considered a final candidate result. Obviously, merely selecting the representative with the lowest instead of sorting the values falls within the scope of the invention. Here, A0B0, A0C0, and B0C0 are final candidate results.

Lastly, the formulas comprise 3 predetermined thresholds representing the amount of variance tolerated according to design parameters before resorting to the use of a candidate result. Each of the thresholds, which are referred to here as TR_AB, TR_AC, and TR_BC corresponds to one of the interactive effect columns (AB, AC, and BC) of the Table 1. The specific value of each threshold TR_AB, TR_AC, or TR_BC can be determined by experimental methods. In this example, TR_AB=TR_AC=TR_BC=300 is assumed although other values may be used without departing from the spirit of the invention.

When the values shown in the Table 3 have been calculated and the preliminary motion vector has been determined, the formulas listed below are used to check for additional interactive effects requiring an adjustment to the preliminary motion vector. The symbols representing the threshold values TR_AB, TR_AC, and TR_BC have already been discussed. The remaining symbols used in the formulas refer directly to the "ABS diff" column (the third level-value) of the Table 3. For example, "D_A" is the "ABS diff" column of the Table 3 for the row "A", "D_B" is the "ABS diff" column of the Table 3 for the row "B", and "D_AB" is the "ABS diff" column of the Table 3 for the row "AB". The formulas are as follows and are labeled 1–6 for convenience:

1) If ((D_A<D_AB+TR_AB) AND (D_AB>D_AC)), use the candidate result to change the level of "A".
2) If ((D_A<D_AC+TR_AC) AND (D_AC>D_AB)), use the candidate result to change the level of "A".
3) If ((D_B<D_AB+TR_AB) AND (D_AB>D_BC)), use the candidate result to change the level of "B".
4) If ((D_B<D_BC+TR_BC) AND (D_BC>D_AB)), use the candidate result to change the level of "B".
5) If ((D_C<D_BC+TR_BC) AND (D_BC>D_AC)), use the candidate result to change the level of "C".
6) If ((D_C<D_AC+TR_AC) AND (D_AC>D_BC)), use the candidate result to change the level of "A".

Using the example level-values and working through the formulas concerning the proper level of "A", (854<56+300) and (56>258) of the formula 1 are both false as is (854<258+300) of the formula 2 and therefore indicate that the level of "A" does not need to be changed.

Continuing with the formulas 3 and 4 concerning the proper level for "B", the formula 3 ((478<56+300) and (56>234)) is again false. However, the formula 4 (478<234+300) and (234>56), both of which are obviously true. This indicates the need of referring to the proper candidate result to determine the proper level of "B" (currently a "0" in the preliminary motion vector). Generating candidate results was described previously. The proper candidate result to use comprises values for "B" and "C" (B0C0) because the third level-value for "BC" appears in both equations of the formula 4. In the current example, the interactive effects from "BC" are large enough to consider modifying the preliminary motion vector. If the formula 3, also concerning the proper level of "B", would have proved true, that formula 3 would have indicated using a different candidate result A0B0 because that formula concerns the interactive effects of the levels of "AB".

However, the formula 4 indicates that the candidate result B0C0 is to be used. Therefore, the "B" in the preliminary motion vector (a "0") is replaced by the level-value of the "B" in the proper candidate result. In this case, the level-value of the "B" in B0C0 is obviously "0" so that the preliminary motion vector remains effectively unchanged. However, given a different example, the level-value of a proper candidate result may change a bit in the preliminary motion vector from a "0" to a "1" or even from a "1" to a "0" depending on the results of the formulas and the candidate list.

The formulas 5 and 6 concern the proper level of "C" and both evaluate to false, therefore, no change of the preliminary motion vector is indicated. Note that there are only three sets of formulas and that none of the three sets can alter the value of "D". As explained previously, this is because the orthogonal table (Table 1) used by the present invention does not comprise a column for interactive effects concerning "D".

The finished final motion vector is generated by modifying the preliminary motion vector as indicated to do so by the formulas and the candidate results. Concluding the above example, the final motion vector is $(00xx_1, 01yy_1)$, indicating that the coordinate $(00xx_1, 01yy_1)$ of search window should be the starting location of any subsequent searches on this or any other layers.

Figure 4:
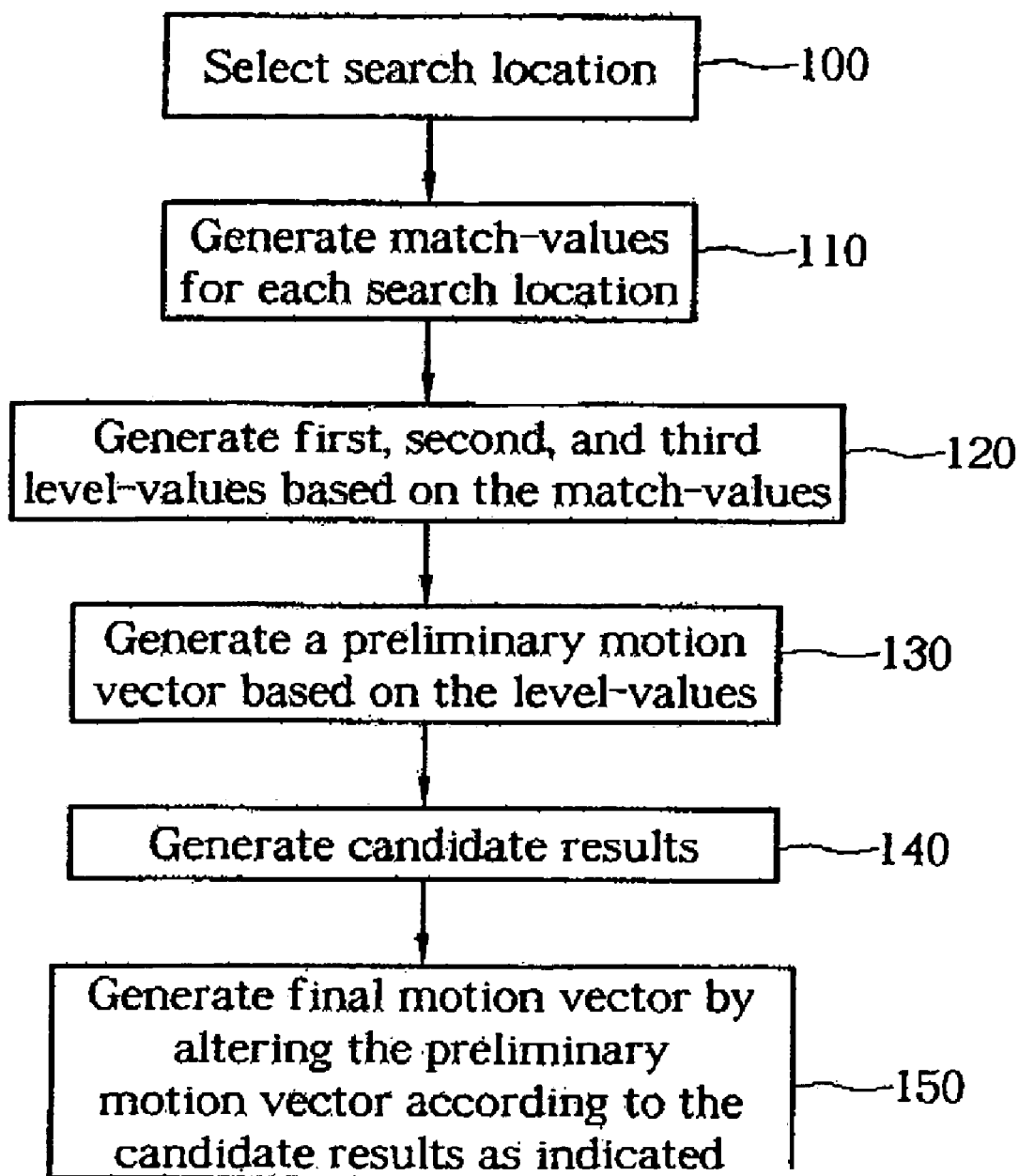
FIG. 4 is a flow chart of motion estimation according to the present invention.

FIG. 4 is a flowchart that gives a good overview of motion estimation according to the present invention. As can be seen in FIG. 4, the method comprises the following steps:

Step 100:

Select the search locations within the search window. As described above, these search locations come from the Table 1;

Step 110:

Generate a match-value for each search location. The match-value represents how closely that search location matches a reference block;

Step 120:

Generate the first level-values, the second level-values, and the third level-values based on the match-values;

Step 130:

Generate a preliminary motion vector based on the relative magnitudes of the first level-values and the second level-values;

Step 140:

Generate candidate results based on the match-values; and

Step 150:

Generate the final motion vector by altering the preliminary motion vector to values designated by the candidate results when the predetermined formulas indicate that the preliminary motion vector requires adjustment.

Tables 4 and 5 compare the results of searches using a sample reference block and a sample search window using two prior art methods and the method employed by the present invention. Both of the Table 4 and the Table 5 use an 8 by 8 pixel reference block and search a 16 by 16 pixel search window. Each row of the Tables 4 and 5 show, in an "X, Y" format, the target's location and the motion vector obtained by a Full Search, by a Three Step Search, and by the present invention.

The Table 4 uses a reference block comprising a well-defined woman's eye as the woman's eye is moved to different target locations within the search window. As can be seen in Table 4, the accuracy of the present invention exceeds the Three Step Search even though the present method employs fewer search locations and thus fewer calculations.

TABLE 4

| Target Location | Full Search | Three Step | Present Invention |
|---|---|---|---|
| 2, 2 | 2, 2 | 2, 2 | 2, 2 |
| 2, 6 | 2, 6 | 2, 6 | 3, 6 |
| 2, 11 | 2, 11 | 2, 11 | 2, 11 |
| 2, 15 | 2, 15 | 4, 15 | 2, 15 |
| 6, 2 | 6, 2 | 6, 2 | 6, 2 |
| 6, 6 | 6, 6 | 6, 6 | 6, 6 |
| 6, 11 | 6, 11 | 6, 11 | 6, 11 |
| 6, 15 | 6, 15 | 9, 15 | 6, 15 |
| 11, 2 | 11, 2 | 11, 2 | 11, 2 |
| 11, 6 | 11, 6 | 11, 6 | 11, 6 |
| 11, 11 | 11, 11 | 11, 11 | 11, 11 |
| 11, 15 | 11, 15 | 11, 15 | 11, 15 |
| 15, 2 | 15, 2 | 15, 2 | 15, 2 |
| 15, 6 | 15, 6 | 15, 6 | 15, 6 |
| 15, 11 | 15, 11 | 15, 11 | 15, 11 |
| 15, 15 | 15, 15 | 15, 15 | 15, 15 |
| Total Error | — | 5 | 1 |

The Table 5 uses a reference block comprising a somewhat less defined widget as the widget is moved to different target locations within the search window. As can be seen in Table 5, the accuracy of the present invention again exceeds the Three Step Search even though the present method employs fewer search locations.

TABLE 5

| Target Location | Full Search | Three Step | Present Invention |
|---|---|---|---|
| 2, 2 | 2, 2 | 15, 9 | 15, 1 |
| 2, 6 | 2, 6 | 15, 13 | 15, 5 |
| 2, 10 | 2, 10 | 15, 9 | 2, 10 |
| 2, 13 | 2, 13 | 5, 11 | 6, 13 |
| 2, 15 | 15, 14 | 15, 12 | 5, 12 |
| 6, 2 | 6, 2 | 6, 2 | 15, 2 |
| 6, 6 | 6, 6 | 9, 6 | 6, 6 |
| 6, 10 | 6, 10 | 10, 10 | 6, 10 |
| 6, 13 | 6, 13 | 6, 13 | 6, 13 |
| 6, 15 | 5, 15 | 7, 12 | 7, 12 |
| 10, 2 | 10, 2 | 10, 2 | 10, 2 |
| 10, 6 | 10, 6 | 10, 6 | 10, 6 |
| 10, 10 | 10, 10 | 10, 10 | 10, 10 |
| 10, 13 | 10, 13 | 10, 13 | 9, 13 |
| 10, 15 | 9, 15 | 12, 12 | 12, 12 |
| 13, 2 | 13, 2 | 13, 2 | 13, 2 |
| 13, 6 | 13, 6 | 13, 6 | 13, 6 |
| 13, 10 | 13, 10 | 13, 10 | 13, 10 |
| 13, 13 | 13, 13 | 13, 13 | 13, 13 |
| 13, 15 | 12, 15 | 9, 12 | 9, 12 |
| 15, 2 | 15, 2 | 10, 10 | 15, 2 |
| 15, 6 | 15, 6 | 15, 6 | 15, 6 |
| 15, 10 | 15, 10 | 12, 6 | 15, 10 |
| 15, 13 | 15, 13 | 12, 9 | 15, 13 |
| 15, 15 | 15, 15 | 13, 15 | 13, 15 |
| Average Error | 06415 | 39298 | 33877 |

Figure 5:
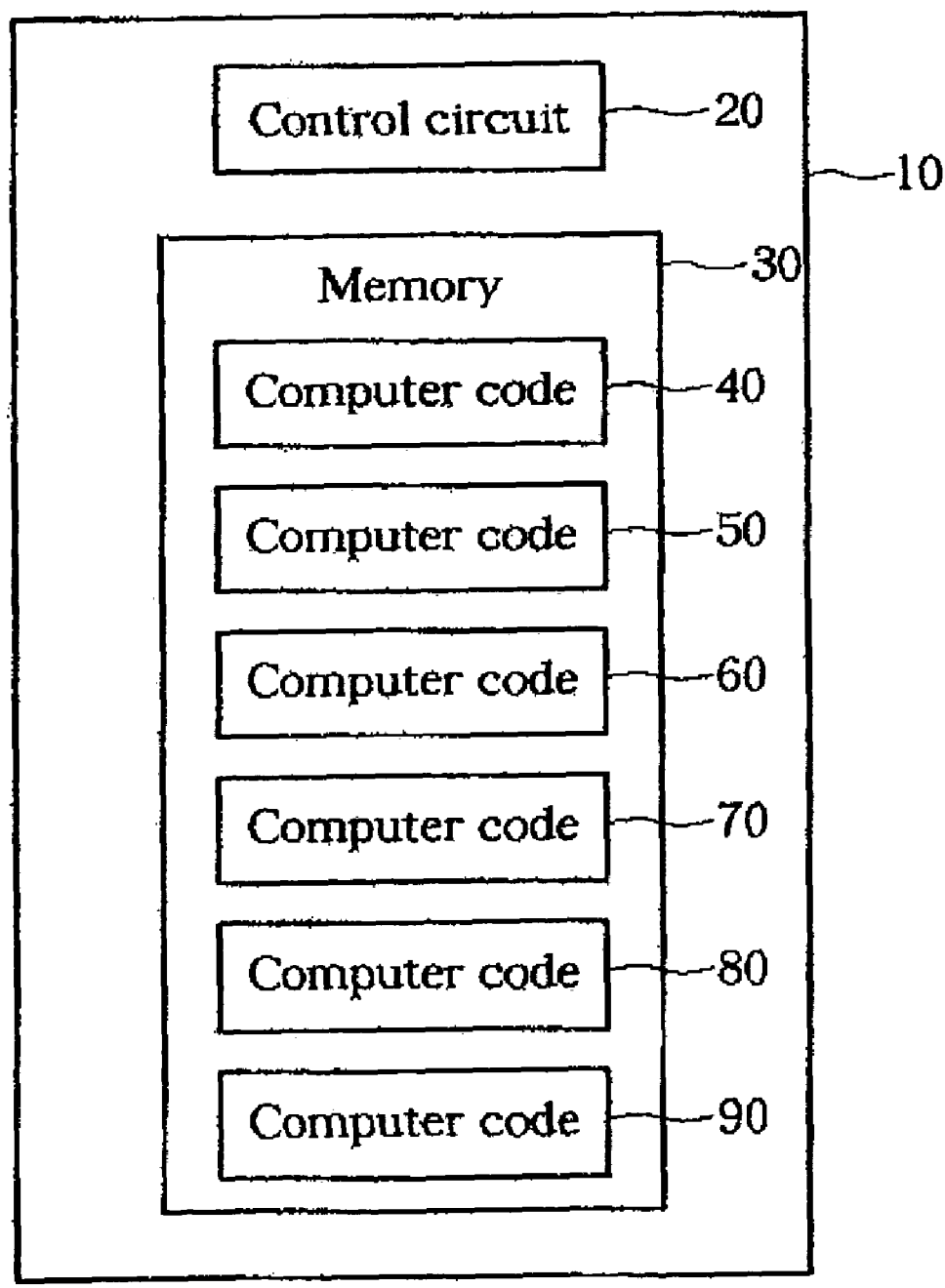
FIG. 5 is a functional block diagram of a motion estimation device according to the present invention.

A device for video compression using motion estimation according to the present invention is shown in FIG. 5. The device 10 comprises a control circuit 20 for executing computer code and a memory 30. The memory 30 comprises computer code 40 that determines a plurality of search locations within a search window, computer code 50 that compares a reference block with each search location and generates a match-value for each search location indicating how closely each search location matches the reference block, computer code 60 that generates a plurality level-values based on a first dispositional relationship of the search locations and the relative magnitudes of the match-values, computer code 70 that generates a preliminary motion vector based on the level-values, computer code 80 that generates candidate results based on a second dispositional relationship of the search locations and the relative magnitudes of the match-values, and computer code 90 that generates a final motion vector by altering the preliminary motion vector according to the candidate results as indicated by a predetermined set of formulas. The control circuit executes the computer code 40–90 to generate the motion vector for video compression according to the present invention. Obviously, it may be possible to practice the teachings of the present invention without having all of the computer code 40–90 in memory simultaneously. One embodiment of the present invention has the computer code 40–90 on a computer readable media, such as a CD or a hard disk, and loads the computer code 40–90 into memory for execution as needed. Additionally, motion estimation according to the present invention can obviously be used in combination with other methods. For example, the present invention can be used on one layer of a multi-layered search and the Three-Step method used on the remaining layers with good results.

In contrast to the prior art, the present invention reduces the number of search locations within a search window by selecting the locations from a predefined orthogonal table. These search locations are then compared with a reference block to generate match-values to indicate how closely each search location matches the reference block.

Here, the prior art generates a motion vector based on the minimum match-value. In contrast, the present invention uses the match-values to generate level-values reflecting dispositional relationships of the search locations and the relative magnitudes of the match-values. A preliminary motion vector is generated according to the relative magnitudes of associated level-values. Candidate results are also generated based on the match-values of proximate search locations. Predetermined formulas are applied to the level-values and the preliminary motion vector is altered according to the candidate results when indicated to do so by the results of the formulas.

The present invention discloses an experimental design for motion estimation in video compression that reduces the number of search locations in a search window, thereby reducing the processor load and increasing the speed of video compression/decompression. Furthermore, the benefits of the present invention are obtained without sacrificing accuracy in motion vector determination, and therefore without sacrificing the quality of the video image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for motion estimation in video compression, the method comprising:
   selecting a plurality of search locations within a single resolutioned search window, the search locations selected according to a predetermined table comprising a first column, a second column, and a plurality of rows, each row in the table specifying a unique search location;
   generating a match-value for each search location indicating how closely each search location matches a reference block;
   generating a plurality of level-values based on first dispositional relationships of the search locations and the relative magnitudes of the match-values;
   generating a preliminary motion vector based on the level-values;
   generating a plurality of candidate results based on second dispositional relationships of the search locations and the relative magnitudes of the match-values; and
   generating a final motion vector by altering the preliminary motion vector according to the candidate results as indicated by a predetermined set of formulas;
   wherein the table is an orthogonal table generated using the statistical model $x=\mu+A+B+C+D+A\times B+A\times C+B\times C+\epsilon$ where $\epsilon$ is an error factor, and $\mu$ is an average of A, B, C, D, AB, AC, and BC, the orthogonal table having columns A, B, C, and D.

2. The method of claim 1 wherein the column A equals the most significant bit of an X coordinate in the search window, the column B equals the second most significant bit of the X coordinate in the search window, the column C equals the most significant bit of a Y coordinate in the search window, the column D equals the second most significant bit of the Y coordinate in the search window.

3. The method of claim 1 wherein generating the candidate results comprises separately summing the match-values of the search locations having a third value in the first column and the third value in the second column, having the third value in the first column and a fourth value in the second column, having the fourth value in the first column and the third value in the second column, and having the fourth value in the first column and the fourth value in the second column, and selecting the smallest sum as the candidate result.

4. The method of claim 1 wherein the level-values comprise, for each column in the predetermined table, a first level-value being a sum of the match-values of the search locations having a first value in that column, a second level-value being a sum of the match-values of the search locations having a second value in that column, and a third level-value being the absolute difference between the first level-value and the second level-value.

5. The method of claim 4 wherein the preliminary motion vector comprises a plurality of bits representing an X coordinate within the search window and a plurality of bits representing a Y coordinate within the search window, the most significant bit of the X coordinate of the preliminary motion vector is the first value if the first level-value of the first column is less than the second level-value of the first column and the most significant bit of the X coordinate of the preliminary motion vector is the second value if the first level-value of the first column is not less than the second level-value of the first column, the Y coordinate of the preliminary motion vector is the first value if the first level-value of the second column is less than the second level-value of the second column and the most significant bit of the Y coordinate of the preliminary motion vector is the second value if the first level-value of the second column is not less than the second level-value of the second column.

6. The method of claim 4 wherein the final motion vector comprises a plurality of bits representing an X coordinate within the search window and a plurality of bits representing a Y coordinate within the search window, the candidate results being used to generate the most significant bit of the X coordinate of the final motion vector when indicated by the predetermined set of formulas and the candidate results being used to generate the most significant bit of the Y coordinate of the final motion vector when indicated by the predetermined set of formulas.

7. The method of claim 1 wherein generating the match-values comprises calculating the sum of the absolute differences in brightness between each pixel in the reference block and a corresponding pixel in the search location to generate the match-value for that search location.

8. A device for motion estimation in video compression, the device comprising:
   a control circuit for executing computer code; and
   a memory comprising:
      computer code that determines a plurality of search locations within a single resolutioned search window;
      a predetermined orthogonal table having a first column, a second column, and a plurality of rows, each row in the table specifying a unique search location;
      computer code that compares a reference block with each search location and generates a match-value for each search location indicating how closely each search location matches the reference block;
      computer code that generates a plurality of level-values based on a first dispositional relationship of the search locations and the relative magnitudes of the match-values;
      computer code that generates a preliminary motion vector based on the level-values;
      computer code that generates candidate results based on a second dispositional relationship of the search locations and the relative magnitudes of the match-values; and
      computer code that generates a final motion vector by altering the preliminary motion vector according to the candidate results as indicated by a predetermined set of formulas;
      wherein the level-values comprise, for each column in the predetermined table, a first level-value being a sum of the match-values of the search locations having a first value in that column, a second level-value being a sum of the match-values of the search locations having a second value in that column, and a third level-value being the absolute difference between the first level-value and the second level-value.

9. The device of claim 8 wherein the orthogonal table is conformal with the statistical model $x=\mu+A+B+C+D+A\times B+A\times C+B\times C+\epsilon$ where $\epsilon$ is an error factor, and $\mu$ is an average of A, B, C, D, AB, AC, and BC.

10. The device of claim 8 wherein the preliminary motion vector comprises a plurality of bits representing an X coordinate within the search window and a plurality of bits representing a Y coordinate within the search window, the most significant bit of the X coordinate of the preliminary motion vector is the first value if the first level-value of the first column is less than the second level-value of the first column and the most significant bit of the X coordinate of the preliminary motion vector is the second value if the first level-value of the first column is not less than the second level-value of the first column, the Y coordinate of the preliminary motion vector is the first value if the first level-value of the second column is less than the second level-value of the second column and the most significant bit of the Y coordinate of the preliminary motion vector is the second value if the first level-value of the second column is not less than the second level-value of the second column.

11. The device of claim 8 wherein the final motion vector comprises a plurality of bits representing an X coordinate within the search window and a plurality of bits representing a Y coordinate within the search window, the candidate results being used to generate the most significant bit of the X coordinate of the final motion vector when indicated by the predetermined set of formulas and the candidate results being used to generate the most significant bit of the Y coordinate of the final motion vector when indicated by the predetermined set of formulas.

12. A computer readable media storing therein computer-executable program codes for motion estimation in video compression, the computer readable media comprising:

computer code that determines a plurality of search locations within a single resolutioned search window, the search locations selected according to a predetermined orthogonal table generated using the statistical model $x=\mu+A+B+C+D+A\times B+A\times C+B\times C+\epsilon$ where $\epsilon$ is an error factor, and $\mu$ is an average of A, B, C, D, AB, AC, and BC, the orthogonal table having columns A, B, C, and D;

computer code that compares a reference block with each search location and generates a match-value for each search location indicating how closely each search location matches the reference block;

computer code that generates a plurality level-values based on a first dispositional relationship of the search locations and the relative magnitudes of the match-values;

computer code that generates a preliminary motion vector based on the level-values;

computer code that generates candidate results based on a second dispositional relationship of the search locations and the relative magnitudes of the match-values; and computer code that generates a final motion vector by altering the preliminary motion vector according to the candidate results as indicated by a predetermined set of formulas.

13. The computer readable media of claim 12 wherein at least one of the level-values equals the sum of the match-values of a plurality of predetermined search locations.

14. The method of claim 1 wherein at least one of the level-values equals the sum of the match-values of a plurality of predetermined search locations.

15. The device of claim 8 wherein at least one of the level-values equals the sum of the match-values of predetermined search locations.

16. The device of claim 15 wherein the predetermined search locations are all of the plurality of search locations having the same most significant bit of an X coordinate and/or a Y coordinate respectively identifying that search location.

\* \* \* \* \*